(12) United States Patent
Easterling

(10) Patent No.: US 9,610,684 B1
(45) Date of Patent: Apr. 4, 2017

(54) RETRIEVING DEVICE

(71) Applicant: Jason Easterling, Conway, SC (US)

(72) Inventor: Jason Easterling, Conway, SC (US)

( * ) Notice: Subject to any disclaimer, the term of this patent is extended or adjusted under 35 U.S.C. 154(b) by 0 days.

(21) Appl. No.: 14/923,658

(22) Filed: Oct. 27, 2015

(51) Int. Cl.
*B66C 1/00* (2006.01)
*B66C 1/42* (2006.01)
*B25J 1/02* (2006.01)

(52) U.S. Cl.
CPC ........................................ *B25J 1/02* (2013.01)

(58) Field of Classification Search
CPC .. B25B 9/00; B63C 11/50; B63C 3/06; B63C 7/04; A01K 97/24; A01K 87/025; A01K 97/00; A01K 99/00; B25J 1/02
USPC ..... 43/4–5, 17.2, 26.1, 18.1 HR; 114/44, 51; 463/7
See application file for complete search history.

(56) References Cited

U.S. PATENT DOCUMENTS

| | | | | |
|---|---|---|---|---|
| 2,283,784 A | * | 5/1942 | Billings | B66C 13/08 242/381 |
| 2,684,816 A | * | 7/1954 | Leroy | B66C 13/08 242/372 |
| 2,712,919 A | * | 7/1955 | Calvert | B66D 1/02 254/364 |
| 3,097,373 A | | 7/1963 | Wisti | |
| 3,540,770 A | * | 11/1970 | Mitchell | B66C 7/00 212/84 |
| 4,526,413 A | * | 7/1985 | Williams | B66C 13/40 294/198 |
| 5,388,877 A | | 2/1995 | Wenk | |
| 6,106,042 A | | 8/2000 | McCloy, Jr. | |
| D506,517 S | | 6/2005 | Crippen | |
| 7,600,797 B2 | | 10/2009 | Turbish | |
| 8,366,162 B2 | * | 2/2013 | Imlach | B66C 1/30 294/110.1 |
| 8,833,818 B2 | | 9/2014 | Simpson | |
| 2014/0132014 A1 | | 5/2014 | Simpson | |

FOREIGN PATENT DOCUMENTS

CN 203233701 10/2013

* cited by examiner

*Primary Examiner* — Stephen Vu
(74) *Attorney, Agent, or Firm* — Kyle A. Fletcher, Esq.

(57) ABSTRACT

The retrieving device is a device adapted to retrieve an object via a closeable claw that is affixed to a line. The line is dispensed via a reel that is mounted adjacent to a rod such that the retrieving device resembles a fishing rod. The closeable claw includes a motor and at least one gear is collectively affixed to a distal end of the line. A plurality of pairs of fingers is pivotably engaged with respect to a bottom opening of the claw housing. The plurality of pair of fingers is in mechanical connection with the gear of the motor such that the motor is able to open and close off the plurality of pair of fingers.

17 Claims, 5 Drawing Sheets

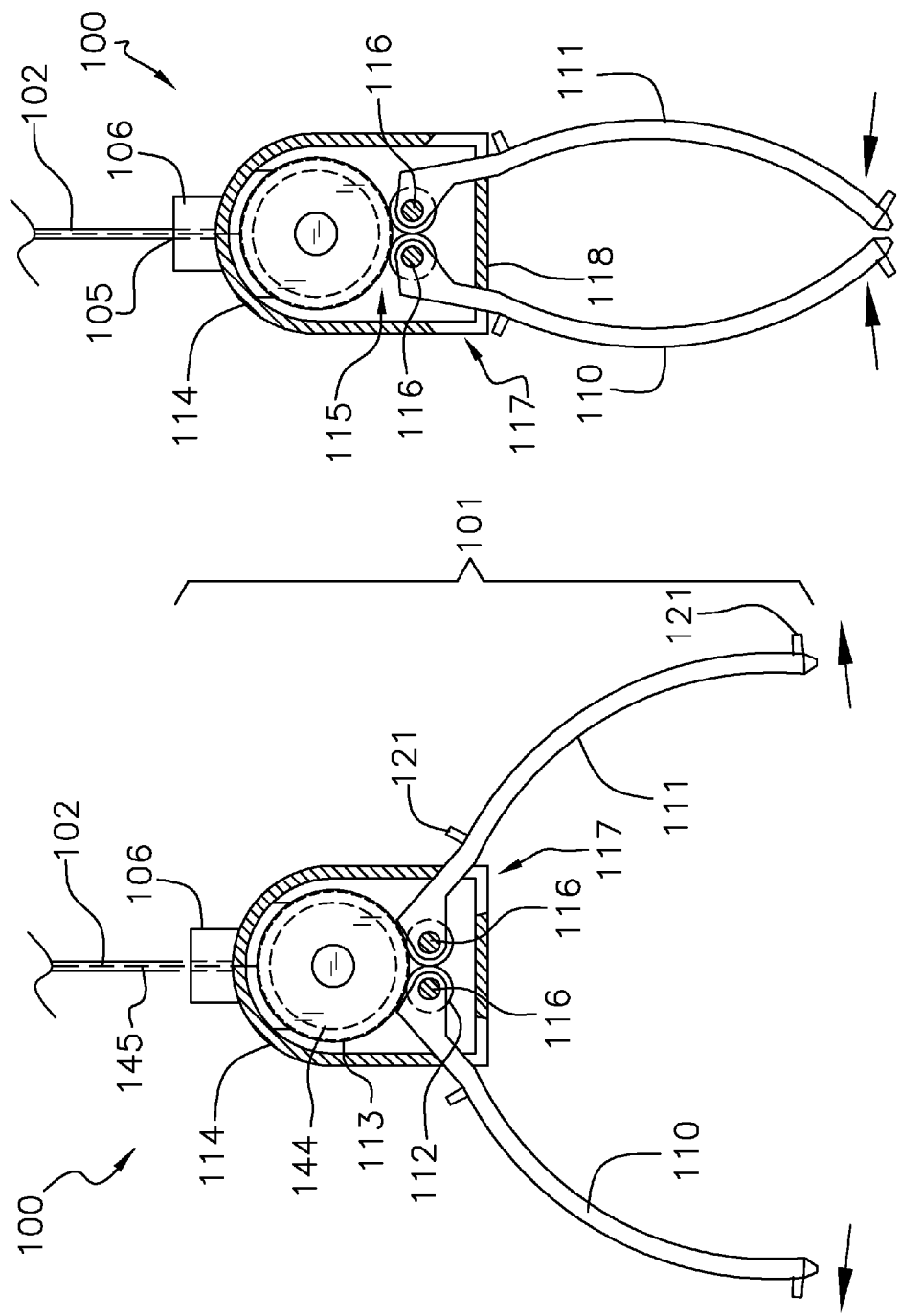

RETRIEVING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of retrieving mechanisms, more specifically, a retrieving device that includes a rod with a reel with a line attached to a closeable claw.

SUMMARY OF INVENTION

The retrieving device is a device adapted to retrieve an object via a closeable claw that is affixed to a line. The line is dispensed via a reel that is mounted adjacent to a rod such that the retrieving device resembles a fishing rod. The closeable claw includes a motor and at least one gear is collectively affixed to a distal end of the line. A plurality of pairs of fingers is pivotably engaged with respect to a bottom opening of the claw housing. The plurality of pair of fingers is in mechanical connection with the gear of the motor such that the motor is able to open and close off the plurality of pair of fingers.

An object of the invention is to provide a closeable claw that is extend and retracted from a rod and reel so as to grasp an object from afar, and retrieve said object.

Another object of the invention is for the closeable claw to include a plurality of pair of fingers that are opened and closed via a motor provided in the claw housing.

Another object of the invention is for the closeable claw to be casted and retracted via a rod and reel.

These together with additional objects, features and advantages of the retrieving device will be readily apparent to those of ordinary skill in the art upon reading the following detailed description of the presently preferred, but nonetheless illustrative, embodiments when taken in conjunction with the accompanying drawings.

In this respect, before explaining the current embodiments of the retrieving device in detail, it is to be understood that the retrieving device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the retrieving device.

It is therefore important that the claims be regarded as including such equivalent construction insofar as they do not depart from the spirit and scope of the retrieving device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5A is another cross-sectional view of an embodiment of the disclosure along line 5-5 in FIG. 4.

FIG. 5B is another cross-sectional view of an embodiment of the disclosure along line 5-5 in FIG. 4.

DETAILED DESCRIPTION OF THE EMBODIMENT

Figure 1:
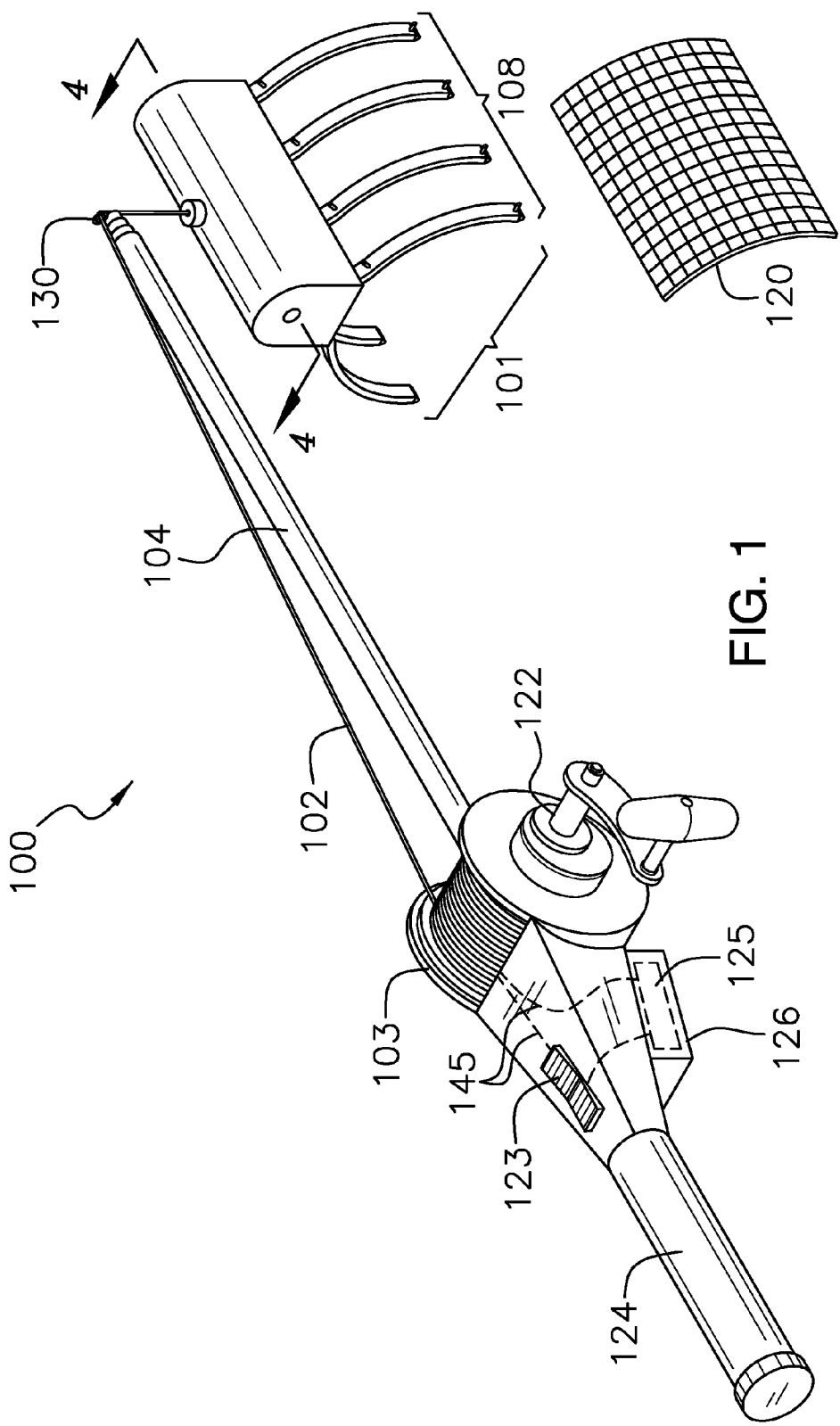
FIG. 1 is a perspective view of an embodiment of the disclosure.
Figure 2:
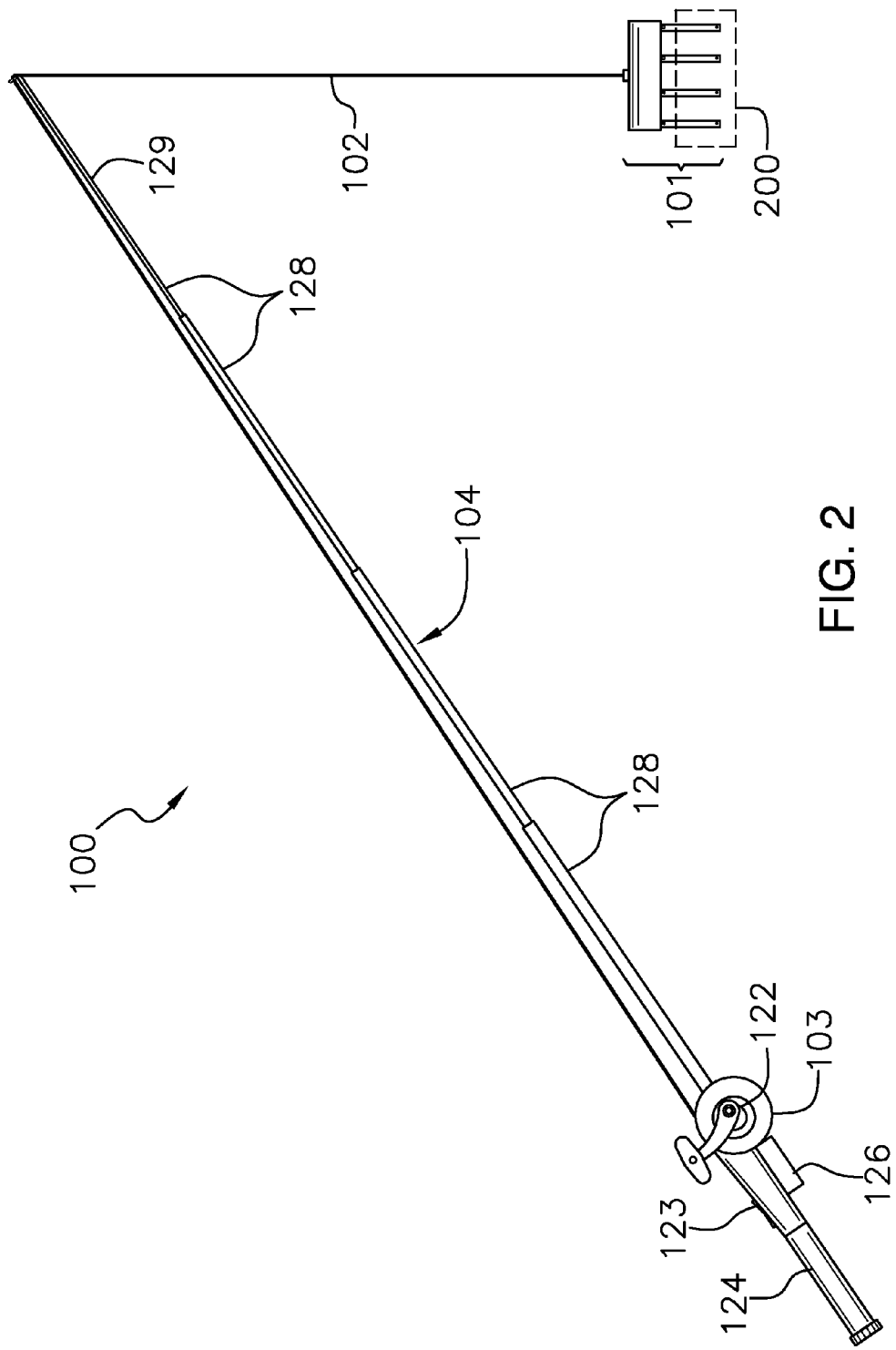
FIG. 2 is a side view of an embodiment of the disclosure.
Figure 3:
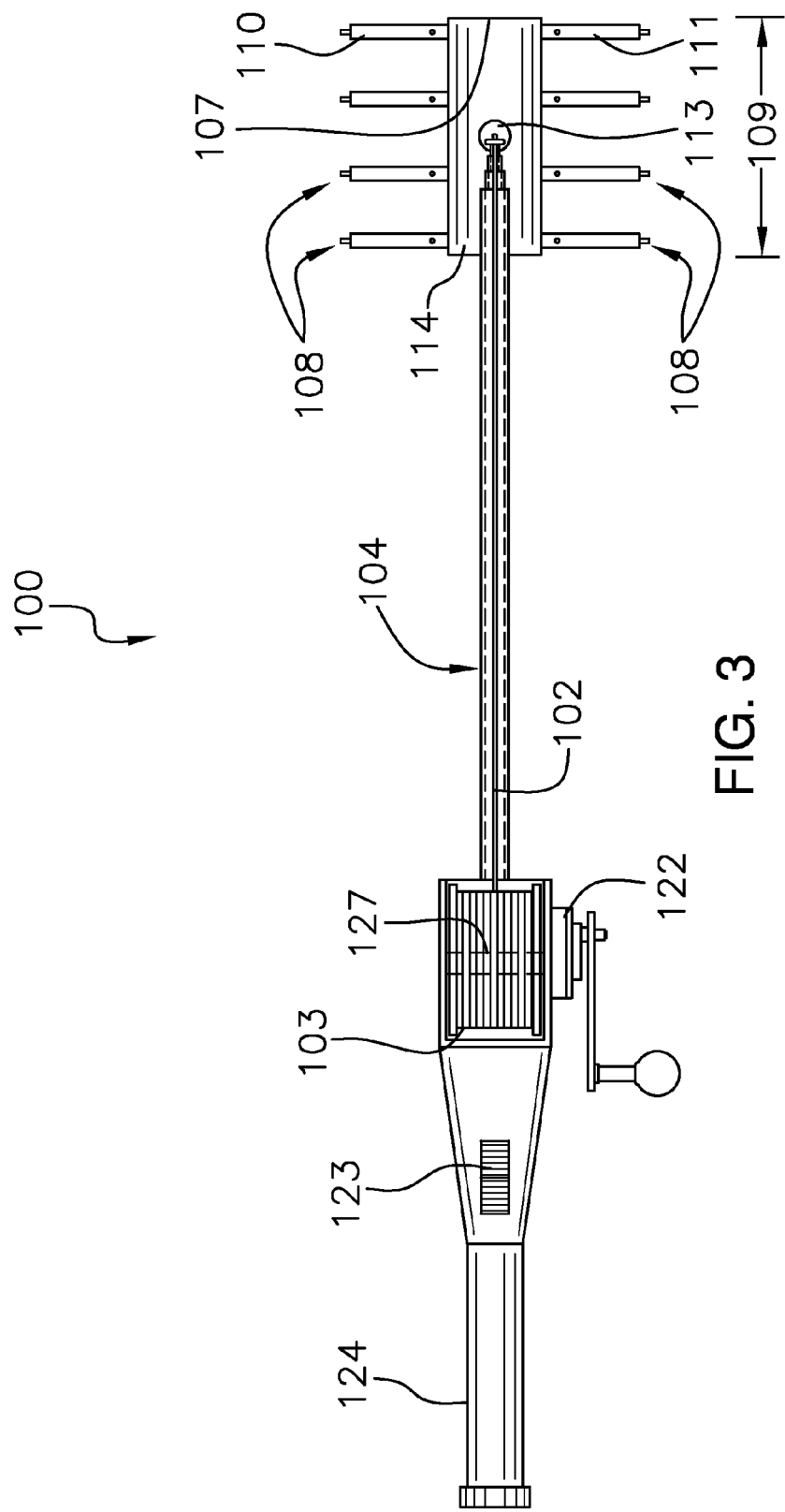
FIG. 3 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5B. The retrieving device 100 (hereinafter invention) comprises a closeable claw 101 that is affixed to a line 102. The line 102 is wound on a reel 103. The reel 103 is affixed to a rod 104. The line 102 is further defined with a line distal end 105, which is affixed to the claw housing 107. More specifically, a housing bracket 106 is provided at the line distal end 105 of the line 102. The housing bracket 106 is affixed to the claw housing 107.

The closeable claw 101 is further defined with a claw housing 107 from which a plurality of pair of fingers 108 is mounted. The claw housing 107 is a rectangular box that includes the plurality of pair of fingers 108. The plurality of pair of fingers 108 is equally spaced along a length 109 of the claw housing 107. The plurality of pair of fingers 108 are each further defined as a first finger 110 and a second finger 111.

The plurality of pair of fingers 108 is attached to and pivots within the cavity 115 of the claw housing 107. The cavity 115 includes finger pivot rods 116 therein. The plurality of pair of fingers 108 are attached to and rotate via the finger pivot rods 116. The cavity 115 has a bottom opening 117, which is accessed via a bottom housing surface 118 of the claw housing 107.

The finger pivot rods 116 each extend laterally across the length 109 of the claw housing 107. The finger pivot rods 116 each include a pivot rod gear 112 that is in mechanical connection with a motor gear 113. The motor gear 113 is in mechanical connection with a motor 144. The pivot rod gear 112, the motor gear 113, the pivot finger rods 116, and the motor 144 are located within the cavity 115 of the claw housing 107. The motor 144 is responsible for opening and closed the plurality of pair of fingers 108. The motor 144 rotates the motor gear 113, which in turn rotates the pivot rod gear 112, which in turn rotates the pivot finger rods 116, and which in turn rotate the plurality of pair of fingers 108.

Figure 4:
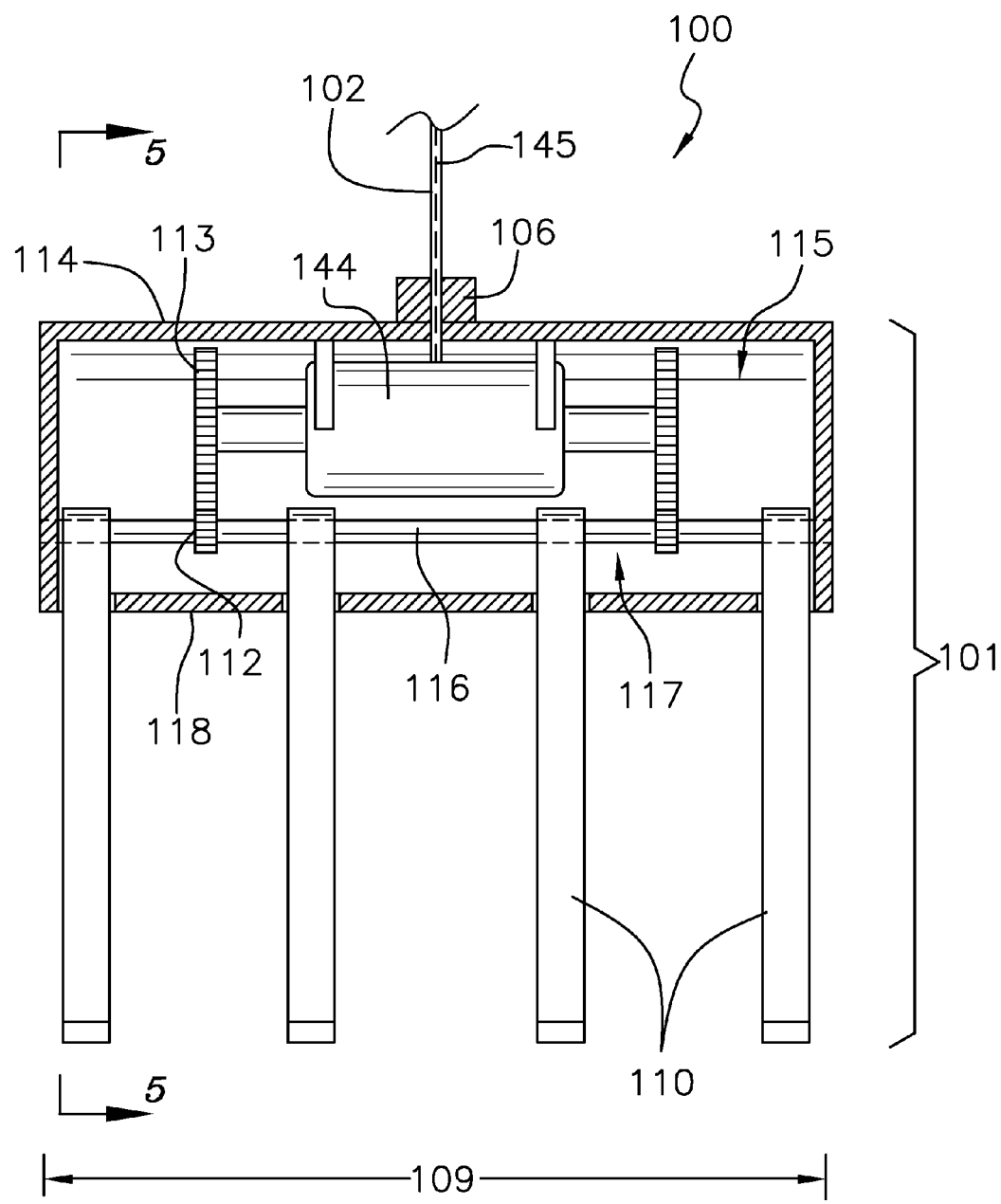
FIG. 4 is a cross-sectional view of an embodiment of the disclosure along line 4-4 in FIG. 3.

Referring to FIGS. 4 and 5, the cavity 115 and the bottom opening 117 enable the plurality of pair of fingers 108 to pivot and extend downwardly from the claw housing 107. Moreover, the first finger 110 and the second finger 111 are able to rotate from an open position (see FIG. 5A) to a closed position (see FIG. 5B). The plurality of pair of fingers 108 is adapted to grab onto and hold an object 200. Moreover, the first finger 110 and the second finger 111 are adapted to grab onto opposing sides of the object 200.

The plurality of pair of fingers 108 is able to attach to at least one screen member 120 via pins 121. The pins 121 are extensions of the first finger 110 and the second finger 111. Moreover, the pins 121 extend outwardly with respect to the first finger 110 and the second finger 111. The at least one screen 120 attaches onto the plurality of pair fingers 108 in order to increase an overall catching area of the closeable claw 101.

The reel 103 is able to wind up or unwind the line 102. Moreover, the reel 103 is rotated via a reel armature 122. The reel armature 122 is manually operable, and works in a manner analogous to a fishing reel. A control button 123 is located adjacent to a handle portion 124 of the rod 102. The control button 123 is wired to a powering member 125. The powering member 125 is at least one battery, which is located inside of a battery compartment 126. The powering member 125 is wired to the motor 144 via at least one motor wire 145 that is provided within the line 102. The at least one motor wire 145 and the line 102 are wound onto a spindle 127 of the reel 103. The spindle 127 coils the line 102 and the at least one motor wire 145. The control button 123 controls the rotation and direction of rotation the motor 144 in order to open or close off the plurality of pair of fingers 108 via the motor 144.

The rod 104 may be constructed of a plurality of rod sections 128, which may telescope. An outermost rod section 129 includes an eyelet 130, which the line 102 extends through. The eyelet 130 of the outermost rod section 129 extends the line 102. Moreover, the line 102 hangs downwardly from the eyelet 130.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A retrieving device comprising:
a reel from which a line extends;
wherein the line is affixed to a closeable claw;
wherein the closeable claw is adapted to engage and grab and secure an object that is to be retrieved;
wherein the line is wound on the reel;
wherein the reel is affixed to a rod;
wherein the line is further defined with a line distal end, which is affixed to a claw housing;
wherein a housing bracket is provided at the line distal end of the line;
wherein the housing bracket is affixed to the claw housing;
wherein the closeable claw is further defined with a claw housing from which a plurality of pair of fingers is mounted.

2. The retrieving device according to claim 1 wherein the claw housing is a rectangular box that includes the plurality of pair of fingers; wherein the plurality of pair of fingers is equally spaced along a length of the claw housing; wherein the plurality of pair of fingers are each further defined as a first finger and a second finger.

3. The retrieving device according to claim 2 wherein the plurality of pair of fingers is attached to and pivots within a cavity of the claw housing; wherein the cavity includes finger pivot rods therein.

4. The retrieving device according to claim 3 wherein the plurality of pair of fingers is attached to and rotate via the finger pivot rods; wherein the cavity has a bottom opening, which is accessed via a bottom housing surface of the claw housing.

5. The retrieving device according to claim 4 wherein the finger pivot rods each extend laterally across the length of the claw housing; wherein the finger pivot rods each include a pivot rod gear that is in mechanical connection with a motor gear.

6. The retrieving device according to claim 5 wherein the motor gear is in mechanical connection with a motor.

7. The retrieving device according to claim 6 wherein the pivot rod gear, the motor gear, the pivot finger rods, and the motor are located within the cavity of the claw housing.

8. The retrieving device according to claim 7 wherein the motor is responsible for opening and closing the plurality of pair of fingers; wherein the motor rotates the motor gear, which in turn rotates the pivot rod gear, which in turn rotates the pivot finger rods, and which in turn rotate the plurality of pair of fingers.

9. The retrieving device according to claim 8 wherein the cavity and the bottom opening enable the plurality of pair of fingers to pivot and extend downwardly from the claw housing; wherein the first finger and the second finger are able to rotate from an open position to a closed position.

10. The retrieving device according to claim 9 wherein the plurality of pair of fingers is adapted to grab onto and hold said object; wherein the first finger and the second finger are adapted to grab onto opposing sides of the object.

11. The retrieving device according to claim 10 wherein the plurality of pair of fingers is able to attach to at least one screen member via pins; wherein the pins are extensions of the first finger and the second finger.

12. The retrieving device according to claim 11 wherein the pins extend outwardly with respect to the first finger and the second finger; wherein at least one screen attaches onto the plurality of pair fingers in order to increase an overall catching area of the closeable claw.

13. The retrieving device according to claim 12 wherein the reel is able to wind up or unwind the line;
   wherein the reel is rotated via a reel armature; wherein a control button is located adjacent to a handle portion of the rod; wherein the control button is wired to a powering member.

14. The retrieving device according to claim 13 wherein the powering member is located inside of a battery compartment; wherein the powering member is wired to the motor via at least one motor wire that is provided within the line.

15. The retrieving device according to claim 14 wherein the at least one motor wire and the line are wound onto a spindle of the reel; wherein the spindle coils the line and the at least one motor wire.

16. The retrieving device according to claim 15 wherein the control button controls the rotation and direction of rotation the motor in order to open or close off the plurality of pair of fingers via the motor.

17. The retrieving device according to claim 16 wherein the rod is constructed of a plurality of rod sections, which telescope; wherein an outermost rod section includes an eyelet, which the line extends through; wherein the eyelet of the outermost rod section extends the line; wherein the line hangs downwardly from the eyelet.

* * * * *